(12) United States Patent
Gu

(10) Patent No.: US 10,948,106 B2
(45) Date of Patent: Mar. 16, 2021

(54) SPLIT MICRO-VALVE

(71) Applicant: SUZHOU SKYWELL HEALTHCARE INFORMATION CO., LTD., Jiangsu (CN)

(72) Inventor: Yu Gu, Suzhou (CN)

(73) Assignee: SUZHOU SKYWELL HEALTHCARE INFORMATION CO, LTD, Jiangsu (CN)

( * ) Notice: Subject to any disclaimer, the term of this patent is extended or adjusted under 35 U.S.C. 154(b) by 10 days.

(21) Appl. No.: 16/361,243

(22) Filed: Mar. 22, 2019

(65) Prior Publication Data
US 2019/0219195 A1 Jul. 18, 2019

Related U.S. Application Data

(63) Continuation-in-part of application No. PCT/CN2017/097151, filed on Aug. 11, 2017.

(30) Foreign Application Priority Data

Sep. 22, 2016 (CN) .......................... 201610840900.6
Mar. 20, 2019 (CN) .......................... 201920358109.0

(51) Int. Cl.
F16K 99/00 (2006.01)
B05B 12/08 (2006.01)
(Continued)

(52) U.S. Cl.
CPC ........ F16K 99/0023 (2013.01); B05B 12/087 (2013.01); F16K 15/026 (2013.01);
(Continued)

(58) Field of Classification Search
CPC . B05B 12/087; F16K 99/0023; F16K 15/046; F16K 99/0057; F16K 15/044;
(Continued)

(56) References Cited

U.S. PATENT DOCUMENTS 1,553,184 A * 9/1925 Mueller .................. F16N 21/04
  137/543.17
1,694,625 A * 12/1928 Roberts ................... F16N 21/02
  184/105.3
(Continued)

FOREIGN PATENT DOCUMENTS

CN 102670412 A 9/2012
CN 102935256 A 2/2013
(Continued)

OTHER PUBLICATIONS

International Search Report of PCT Application No. PCT/CN2017/097151, dated Nov. 10, 2017.
(Continued)

Primary Examiner — Marina A Tietjen
Assistant Examiner — Frederick D Soski
(74) Attorney, Agent, or Firm — Jun He Law Offices P.C.; James J. Zhu

(57) ABSTRACT

The present application discloses a micro-valve comprising: a first valve body and a second valve body, at least one of the first and second valve bodies defining a valve chamber and a valve seat, the first valve body having a liquid outlet and the second valve body having a liquid inlet; a valve plug disposed and movable within the valve chamber; and an elastic member disposed within the valve chamber and positioned closer to the liquid inlet than the valve plug. The elastic member has a liquid-inflow position and a liquid-outflow position, and in the liquid-inflow position, the elastic member enables liquid to flow from the liquid inlet through the elastic member to the liquid outlet, in the liquid-outflow position, the valve plug compresses the elastic member, such that the compressed elastic member seals the valve seat, or the compressed elastic member together with the valve plug seals the valve seat, so as to prevent
(Continued)

liquid from flowing back from the liquid outlet to the liquid inlet through the valve seat.

5 Claims, 30 Drawing Sheets

(51) Int. Cl.
*F16K 15/04* (2006.01)
*F16K 15/02* (2006.01)

(52) U.S. Cl.
CPC .......... *F16K 15/044* (2013.01); *F16K 15/046* (2013.01); *F16K 99/0057* (2013.01); *F16K 2099/0086* (2013.01); *Y10T 137/7925* (2015.04); *Y10T 137/7929* (2015.04); *Y10T 137/7936* (2015.04)

(58) Field of Classification Search
CPC .......... F16K 15/026; F16K 2099/0086; Y10T 137/7929; Y10T 137/7925; Y10T 137/7936
See application file for complete search history.

(56) References Cited

U.S. PATENT DOCUMENTS

| | | | | |
|---|---|---|---|---|
| 1,763,927 A * | 6/1930 | Ireland | ..................... | F16K 1/482 251/86 |
| 1,793,958 A * | 2/1931 | Parrish | ..................... | E21B 21/10 137/515.3 |
| 1,844,668 A * | 2/1932 | McGregor | ......... | F16K 17/0406 137/538 |
| 1,878,002 A * | 9/1932 | Smith | ................. | F16K 17/0413 137/60 |
| 1,884,550 A * | 10/1932 | Boynton | ............... | E21B 43/123 137/155 |
| 1,889,122 A * | 11/1932 | Hewitt | ..................... | F16K 15/04 137/512.3 |
| 2,077,040 A * | 4/1937 | Creveling | ............... | F16N 21/02 184/105.3 |
| 2,189,361 A * | 2/1940 | Barlow | ................. | B25D 17/00 55/301 |
| 2,197,271 A * | 4/1940 | Kerrick | ................. | F16K 15/025 137/540 |
| 2,232,359 A * | 2/1941 | Barks | ....................... | F16K 15/00 184/105.3 |
| 2,242,569 A * | 5/1941 | Crowley | ................. | B60C 29/00 152/429 |
| 2,264,375 A * | 12/1941 | Leroy | ..................... | F15B 1/027 137/115.19 |
| 2,400,817 A * | 5/1946 | Fox | ......................... | F16N 21/04 184/105.3 |
| 2,497,758 A * | 2/1950 | Arthur | ..................... | F16N 21/02 184/105.3 |
| 2,525,799 A | 10/1950 | Hecker | | |
| 2,676,608 A * | 4/1954 | Svenson | ............... | F04B 1/0452 137/343 |
| 2,699,179 A * | 1/1955 | Hansen | ................. | G05D 7/0133 137/539 |
| 2,711,928 A * | 6/1955 | Ernest | ..................... | E03C 1/046 137/599.14 |
| 2,929,401 A * | 3/1960 | Cowan | ................. | F16K 15/044 137/516.29 |
| 2,987,075 A * | 6/1961 | Bernard | ................. | E21D 15/512 137/543.17 |
| 2,994,340 A | 8/1961 | Biello et al. | | |
| 3,171,423 A * | 3/1965 | Dillon | ..................... | E03C 1/104 137/218 |
| 3,207,179 A * | 9/1965 | Robert | ................. | G01L 19/0609 137/879 |
| 3,297,049 A * | 1/1967 | Moskovitz | .......... | F16K 17/0406 137/540 |
| 3,335,750 A * | 8/1967 | Kepner | ................. | F16K 15/044 137/515.5 |
| 3,343,564 A * | 9/1967 | Peeples | ................. | F16K 15/044 137/539 |
| 3,421,546 A * | 1/1969 | Jennings | ............. | F16K 31/0662 137/523 |
| 3,482,595 A * | 12/1969 | Coulter | ................. | F16K 15/042 137/539 |
| 3,709,241 A * | 1/1973 | McJones | ................ | F16K 17/40 137/71 |
| 3,782,412 A * | 1/1974 | Darash | ................ | F16K 17/0433 137/514 |
| 3,911,950 A * | 10/1975 | Lowe | ................... | F16K 17/0466 137/543.17 |
| 4,049,017 A * | 9/1977 | Jones | ....................... | F16K 47/04 137/540 |
| 4,105,044 A * | 8/1978 | Davitt | ................... | F16K 15/026 137/517 |
| 4,172,465 A | 10/1979 | Dashner | | |
| 4,195,812 A * | 4/1980 | Norcross | ................. | F16N 21/04 251/148 |
| 4,234,056 A * | 11/1980 | Farrell | .................... | F16N 23/00 137/539 |
| 4,347,915 A * | 9/1982 | Cooper | ................... | F16N 21/02 137/539 |
| 4,366,837 A * | 1/1983 | Roettgen | ............. | F16K 17/0413 116/268 |
| 4,543,987 A * | 10/1985 | Ekeleme, Jr. | ....... | F16K 17/0413 137/522 |
| 4,622,989 A * | 11/1986 | Zlotski | ................. | F16K 15/00 137/315.33 |
| 5,058,623 A * | 10/1991 | Beagle | .................. | F16K 15/025 137/540 |
| 5,104,091 A * | 4/1992 | Rathay | ................... | F16K 11/048 137/596.17 |
| 5,139,047 A * | 8/1992 | Reinicke | ............... | F16K 15/026 137/540 |
| 5,289,842 A * | 3/1994 | Bravo | .................. | B67D 7/3209 137/356 |
| 5,299,598 A * | 4/1994 | Quartana, III | ............ | F16K 1/38 137/516.29 |
| 5,469,884 A * | 11/1995 | Madrid | ................. | F16K 15/026 137/515.7 |
| 5,782,269 A * | 7/1998 | Seaney | ................ | F16K 15/044 137/512.3 |
| 6,068,022 A * | 5/2000 | Schultz | ................. | F02M 37/025 137/538 |
| 6,164,322 A * | 12/2000 | Najmolhoda | ......... | F15B 13/024 137/539 |
| 6,213,981 B1 | 4/2001 | Hiejima et al. | | |
| 6,250,336 B1* | 6/2001 | Murphey | ................. | B60R 15/00 137/539 |
| 7,296,594 B1* | 11/2007 | Phanco | ............... | F16H 61/4017 137/512.2 |
| 7,806,235 B1* | 10/2010 | Roys | ....................... | F16N 13/22 184/6.4 |
| 10,337,633 B2* | 7/2019 | Grenaway | ............ | F16K 27/0281 |
| 2003/0178067 A1* | 9/2003 | Fredrickson | .......... | F16K 17/065 137/529 |
| 2003/0196704 A1* | 10/2003 | Nakazawa | ............ | B60T 8/4031 137/539 |
| 2005/0072477 A1* | 4/2005 | Speer | ..................... | F16K 15/044 137/539 |
| 2005/0199290 A1* | 9/2005 | Hsiao | ..................... | F16K 17/30 137/517 |
| 2009/0000675 A1 | 1/2009 | Baros et al. | | |
| 2009/0032122 A1* | 2/2009 | Hsu | ....................... | F16K 11/105 137/538 |
| 2010/0051119 A1* | 3/2010 | Klein | ..................... | F16K 15/044 137/540 |
| 2011/0091340 A1* | 4/2011 | Sunagawa | ............ | F04B 53/1077 417/559 |
| 2011/0147016 A1 | 6/2011 | Blease et al. | | |

(56) References Cited

U.S. PATENT DOCUMENTS

| | | | | |
|---|---|---|---|---|
| 2011/0315909 A1* | 12/2011 | Oikawa | ................ | F16K 15/026 |
| | | | | 251/337 |
| 2013/0140380 A1 | 6/2013 | Pelfrey et al. | | |
| 2020/0087133 A1* | 3/2020 | Ye | .......................... | F16K 17/10 |

FOREIGN PATENT DOCUMENTS

| | | |
|---|---|---|
| CN | 103211601 A | 7/2013 |
| CN | 106310512 A | 1/2017 |
| CN | 206492109 U | 9/2017 |
| DE | 10335379 B3 | 11/2004 |
| DE | 202015104202 U1 | 8/2015 |
| EP | 2072871 A2 | 6/2009 |
| GB | 1561514 A | 2/1980 |

OTHER PUBLICATIONS

The extended European search report of European application No. 17852252.0, dated Apr. 1, 2020.

* cited by examiner

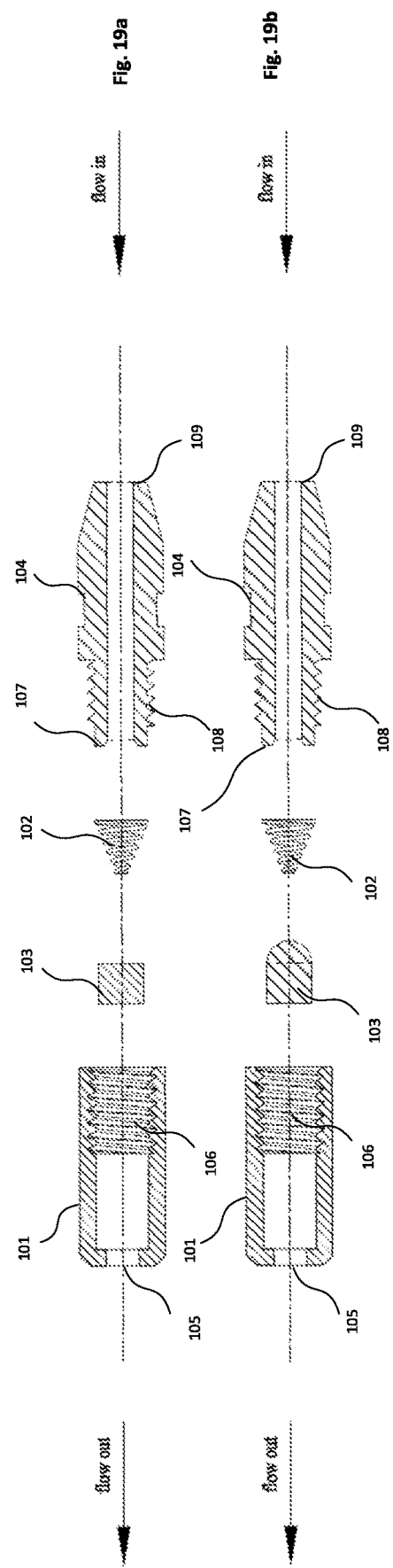

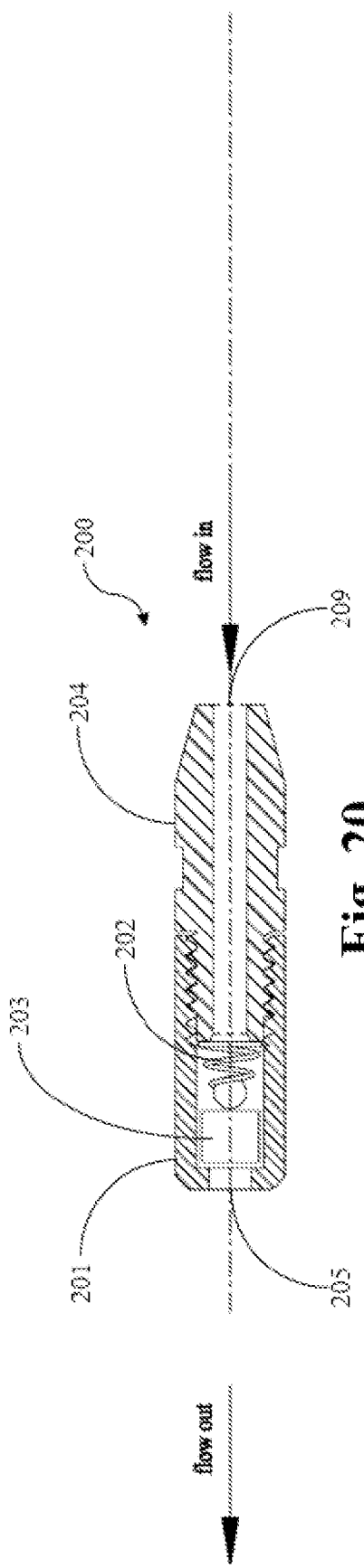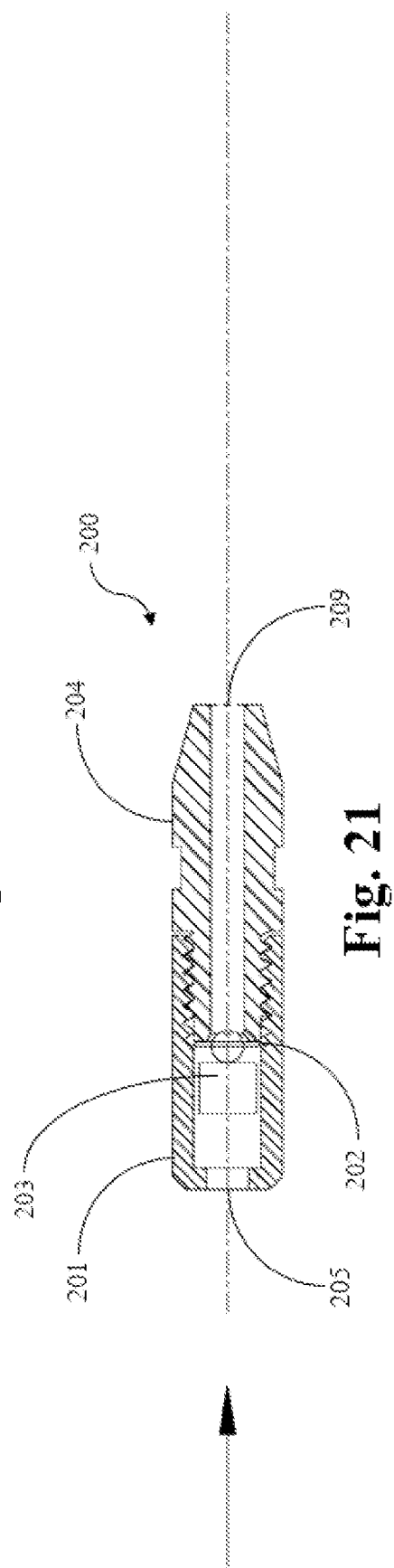

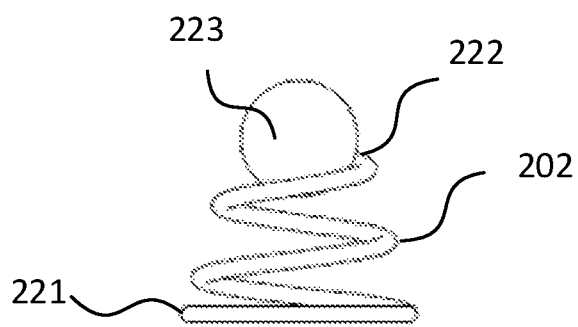
Fig. 22b
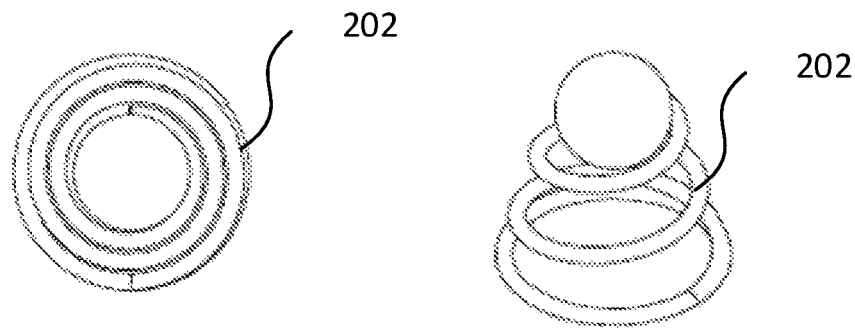
Fig. 22c  Fig. 22a

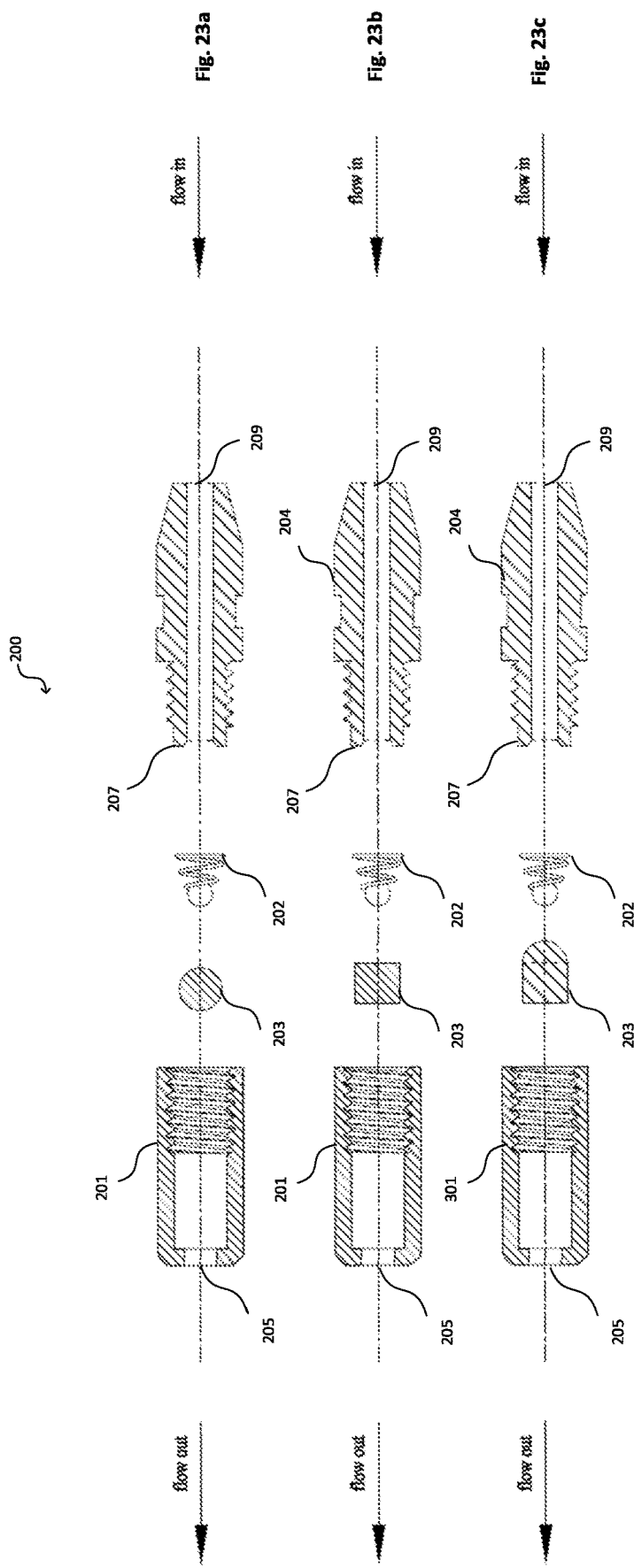

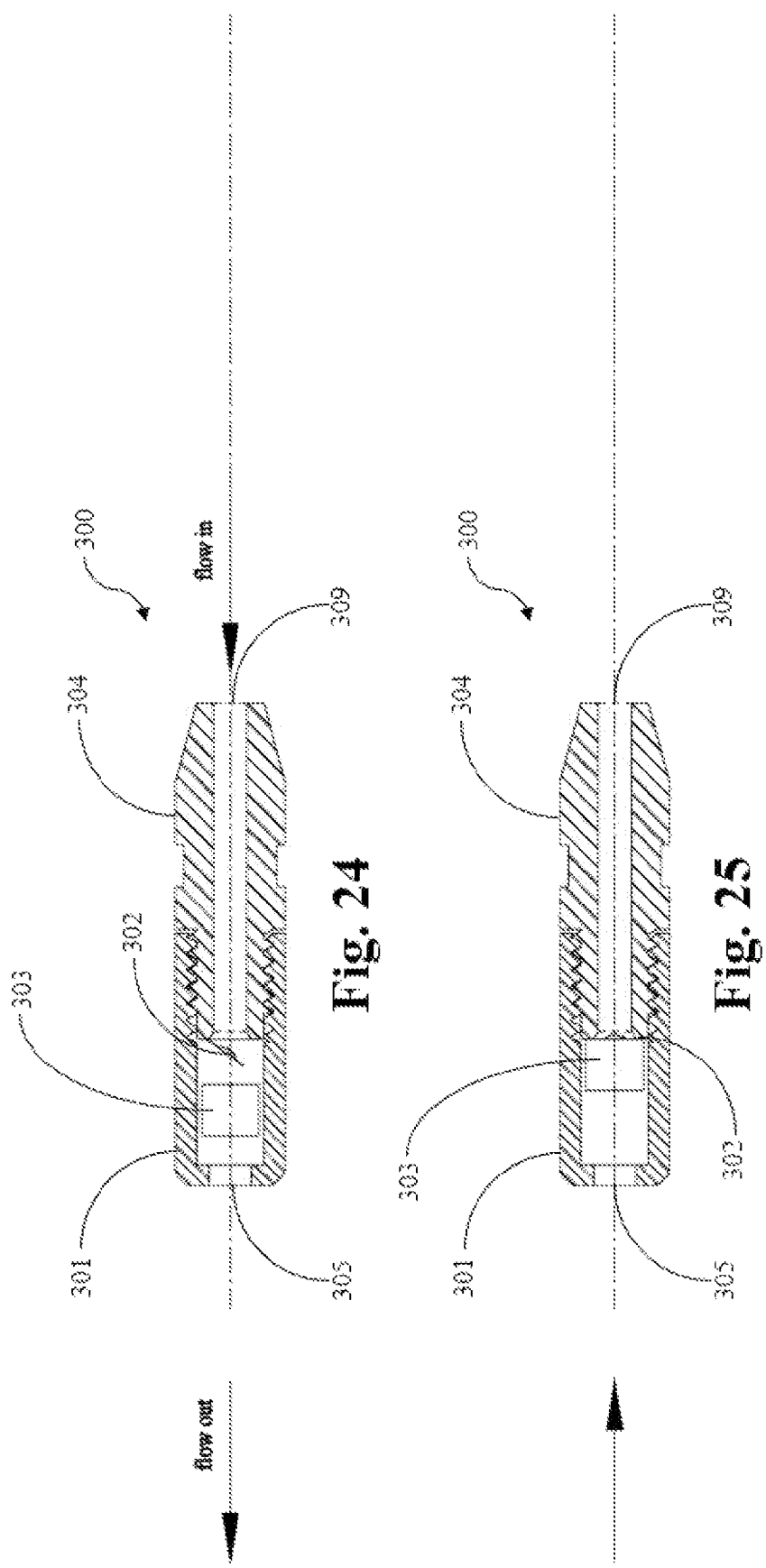

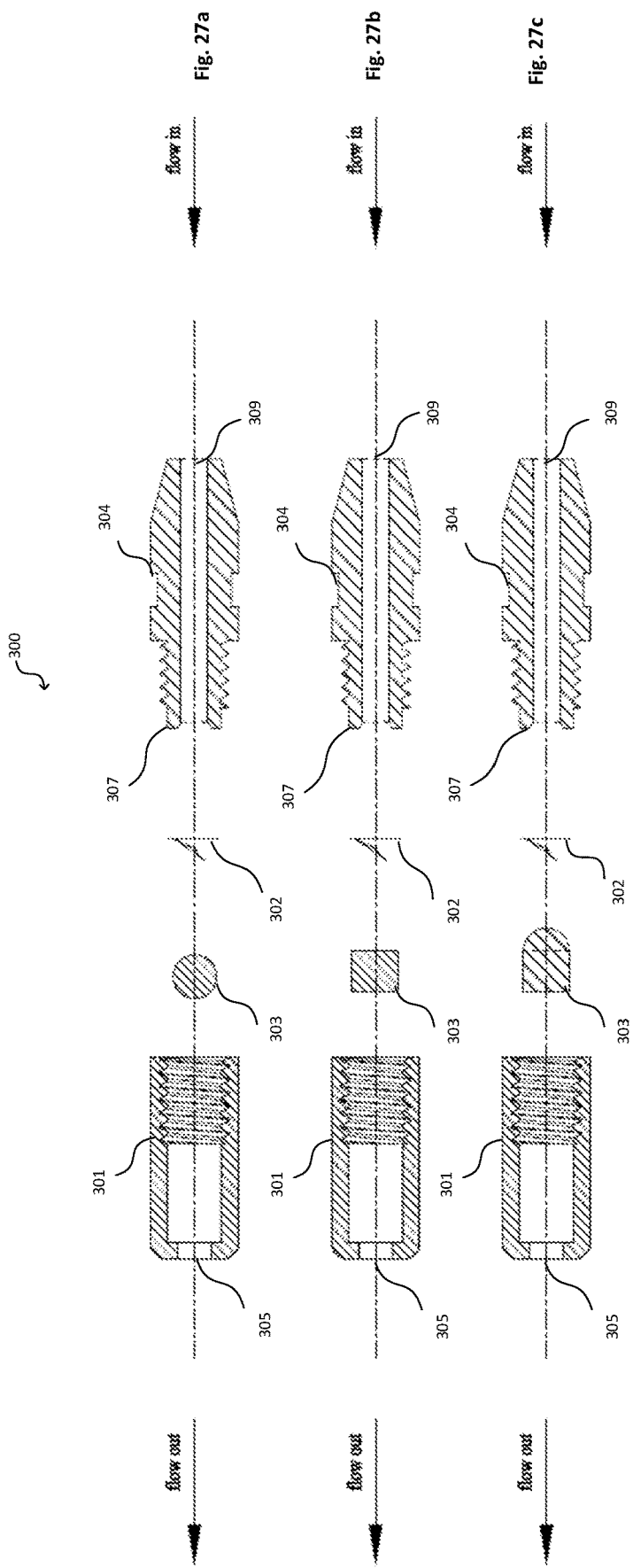

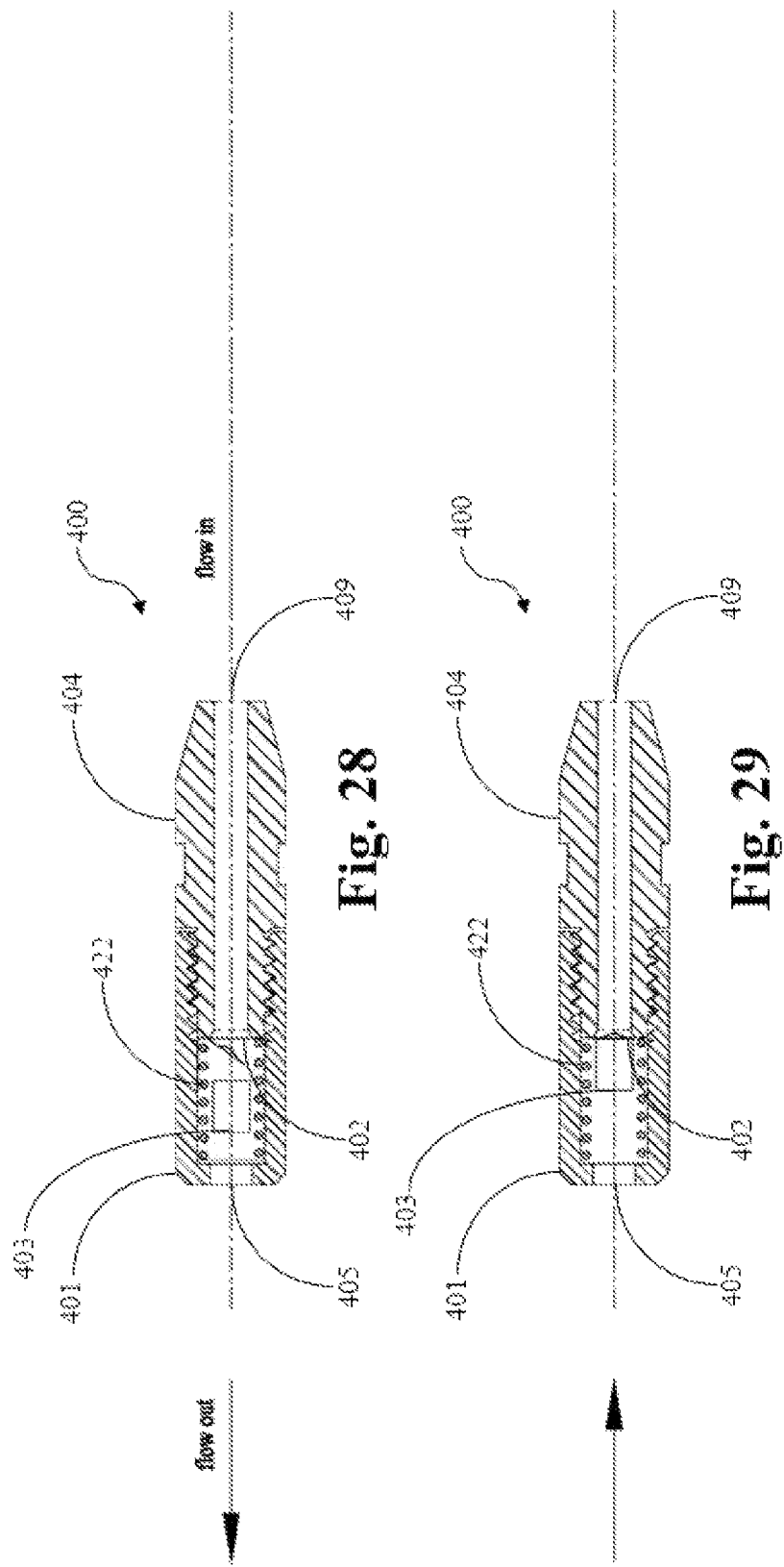

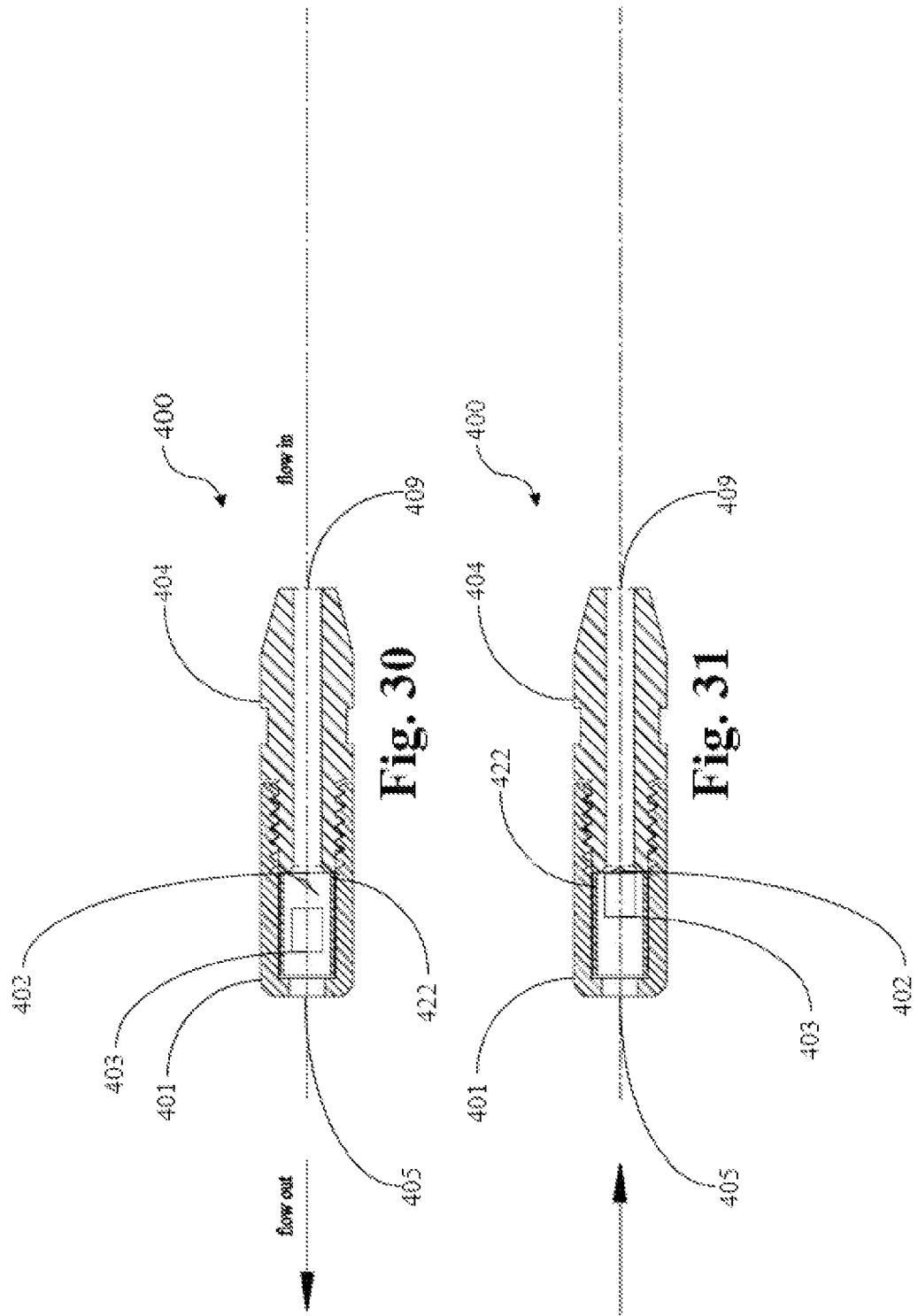

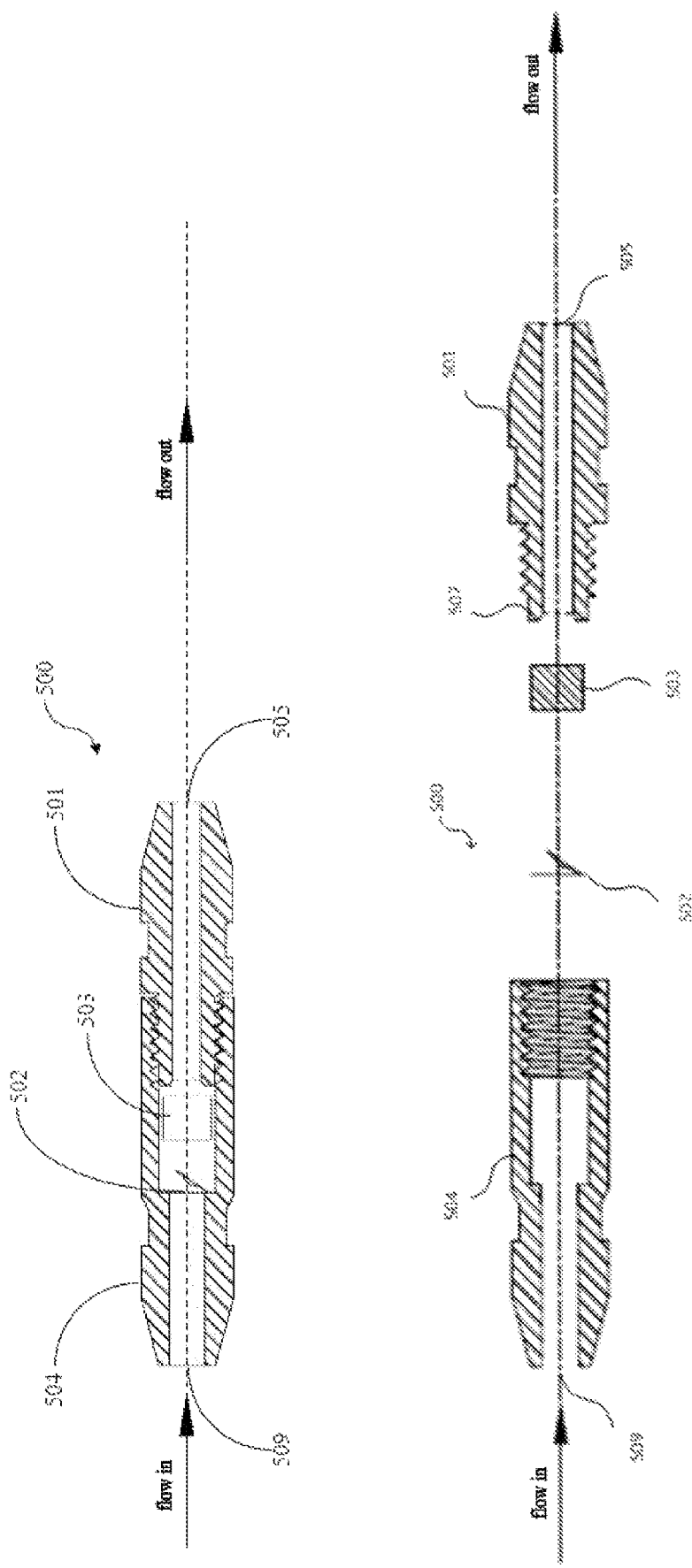

SPLIT MICRO-VALVE

CROSS REFERENCE TO RELATED APPLICATIONS

The present application is a continuation-in-part of an International Application PCT/CN2017/097151 filed on Aug. 11, 2017 claiming priority to Chinese patent application No. 201610840900.6 filed on Sep. 22, 2016, and claims priority to Chinese patent application No. 201920358109.0 filed on Mar. 20, 2019, the contents of these documents are incorporated herein in entirety by reference.

TECHNICAL FIELD

The present disclosure relates to a fluid control device, and more particularly to a micro-valve structure for controlling dispensation of micro-fluid.

BACKGROUND

A micro-valve is suitable for dispensing very small amounts of liquid (e.g. in milliliter, microliter). For example, in a drug-delivery atomizer, certain amount of drug is extracted into a nozzle of the atomizer at first. The amount of drug being dispensed each time is typically 15 microliters to 2 milliliters, depending on the type of drug. For such drug-delivery atomizer, a micro-valve is desirably disposed at one end of a suction tube, for controlling the amount of fluid supplied to the drug-delivery atomizer. In clinical medicine, an intravenous injection amount per unit time for some drugs is more important than a total amount of the drugs being injected. In terms of pharmacokinetics, the shorter an interval of drug administration is, the smaller the blood concentration fluctuates. In clinical practice, constant-rate intravenous infusion is most effective. Table 1 below illustrates some commonly used drugs of intravenous general anesthesia, as well as their requirements of volume flow for the constant-rate intravenous infusion.

TABLE 1

Commonly used drugs of intravenous general anesthesia, and their requirements of volume flow for the constant-rate intravenous infusion

| Name of drug | Flow rate of intravenous infusion (mg/min) | Form of drug liquid | Volume flow requirements (ml/min) |
|---|---|---|---|
| Thiopental Sodium | 50 | 1.0 g of each power-injection being diluted into 10 ml | 0.5 |
| Methohexital | 2-5 | 500 mg/5 ml of injection | 0.02-0.05 |
| Ketamin | 0.5-1.5 | 100 mg/10 ml of injection | 0.05-0.15 |
| Propofol | 2.5-5 | 200 mg/ml of injective emulsion | 0.25-0.5 |

If a precise syringe is not available, an intravenous drip can be used after the drug is diluted by a 5% glucose solution. The volume flow rate of intravenous drip is generally 2-4 ml/min.

If a precise syringe is manufactured using a glass needle tube and a stainless steel push rod, the requirements on the manufacturing are high, and the volume flow of injection might be significantly affected by the environment. Therefore, there is a need for a precise syringe with a micro-valve.

An existing micro-valve structure typically comprises a valve body, a valve plug, a spring and a positioner. The valve body, which is a tube-like shape, has at its one end a liquid inlet with a smaller diameter, and an inner side of the liquid inlet forms a valve seat. The valve plug is typically a valve ball, which is put into the valve seat along with the spring through the other end of the valve body. The valve ball is sealingly mated with the valve seat. The positioner is tightly mated with the other end of the valve body to position the spring and valve ball.

When the size of an exterior profile of the valve body is less than 3 mm, metallic materials e.g. stainless steel, may be used preferably. The reason for this is, for example, the difficulty of injection molding because of the small size of the parts, different situations of shrink of plastic parts for each batch of injection molding, or the difficulty in adjusting the parts from different batches. Furthermore, an existing small size metallic one-way valve is not detachable once assembled, which means that the parts cannot be detached for reuse as long as they are assembled together. Thus, the valve may not be used once any part thereof has defects. In practical production stage, each one-way valve being assembled can be put into use only after it passes a leak-checking test. An undetachable one-way valve is scrapped if it fails in the leak-checking test. In use stage, due to the corrosion and oxidation of metallic materials, materials and parts with better properties are desired for increasing service lifetime. However, liquid leakage is still inevitable for a valve after a period of time, and then the valve as a whole has to be scrapped.

In addition, because the liquid being delivered is thick, the residual liquid is easily cured into crystal within the valve body, or the elongated tube is easily blocked, the valve is disposable or has to be cleaned carefully before and after each usage. In order to make sure that no rust stain or liquid remains within the tube, a cleaning process is added, which adversely affects the service lifetime of the valve, and costs including manpower, time and resource.

Furthermore, the flow cannot be adjusted for the existing micro-valve by itself. If it is desired to adjust the flow, an additional rate control valve or other flow control valves are required mounted to the tube, or other type of one-way valve with a more complicated structure is required.

In order to solve at least one of the problems discussed above, there is a need for a new micro-valve structure.

SUMMARY

In one aspect, a micro-valve is provided. The micro-valve comprises: a first valve body and a second valve body, at least one of the first and second valve bodies defining a valve chamber and a valve seat, the first valve body having a liquid outlet and the second valve body having a liquid inlet; a valve plug disposed and movable within the valve chamber; and an elastic member disposed within the valve chamber and positioned closer to the liquid inlet than the valve plug. The elastic member has a liquid-inflow position and a liquid-outflow position, and in the liquid-inflow position, the elastic member enables liquid to flow from the liquid inlet through the elastic member to the liquid outlet, in the liquid-outflow position, the valve plug compresses the elastic member, such that the compressed elastic member seals the valve seat, or the compressed elastic member together with the valve plug seals the valve seat, so as to prevent liquid from flowing back from the liquid outlet to the liquid inlet through the valve seat.

In another aspect, a microfluidic device comprising a micro-valve is provided. The micro-valve comprises: a first valve body and a second valve body, at least one of the first and second valve bodies defining a valve chamber and a valve seat, the first valve body having a liquid outlet and the second valve body having a liquid inlet; a valve plug disposed and movable within the valve chamber; and an elastic member disposed within the valve chamber and positioned closer to the liquid inlet than the valve plug. The elastic member has a liquid-inflow position and a liquid-outflow position, and in the liquid-inflow position, the elastic member enables liquid to flow from the liquid inlet through the elastic member to the liquid outlet, in the liquid-outflow position, the valve plug compresses the elastic member, such that the compressed elastic member seals the valve seat, or the compressed elastic member together with the valve plug seals the valve seat, so as to prevent liquid from flowing back from the liquid outlet to the liquid inlet through the valve seat.

The present application has some advantages below as compared with the prior art.

1. In the prior art, a valve body of a micro-valve is typically form as an integral structure, and the design of the valve focuses more on how to position a valve plug and spring. The valve body of the present application is inventively constructed as a split structure, and the valve plug is disposed at a joint between the two valve body sections which are threaddedly coupled with each other. As a result, the micro-valve can be assembled easily, and no complicated mold is required.

2. Theoretically, a throttle controls its fluid flow by adjusting the throttling section or throttling length. Since the inner part of the micro-valve of the present application can be replaced, the fluid flow of the micro-valve of the present application can be adjusted by using valve plugs having different section sizes or lengths, changing the size of its housing or spring, or other adjustment means, which is similar to the adjusting of the throttle For a situation where flow adjustment does not occurs frequently, only a portion of the parts is needed to be changed for a period of time, which reduces unnecessary storage, configuration and cost.

3. The minimum outer diameter of the entire valve can be as small as 1.5 mm. Even if the one-way valve of the present application is mounted in a tube having a small diameter, the tube section mounted with the micro-valve would not protrude from the tube. As a result, the exterior can extend smoothly, and a tube can be matched easily. The outer diameter of the valve of the present application is even smaller than a known one-way valve or check valve having a diameter of 2.5 mm available from THE LEE COMPANY.

4. The product structure can be detached easily, and thus every single part can be replaced independently. An undesirable part can be replaced in time once being found. Furthermore, the coupling between different parts of the valve can be adjusted easily, and thus the quality of the entire product can be improved. In addition, the cost of materials is reduced, and the cost for the entire product is thus reduced, which is beneficial for market competition.

5. The product structure can be detached easily, and thus visible cleaning and disinfection can be used. As a result, the use cost and process loss can be reduced.

6. The elastic member can effectively prevent backflow of liquid to the liquid pool of the atomizer.

BRIEF DESCRIPTION OF THE DRAWINGS

FIGS. 19a-b are section views of other two structures in the seventh embodiment;
FIG. 20 is a structure diagram of an eighth embodiment according to the present disclosure;
FIG. 21 is a diagram of the micro-valve of FIG. 20 at the end of operation (at third state);
FIGS. 22a-22c is the structure view, front view, and top view of the spring in FIG. 20;
FIGS. 23a-23c are section views of three structures in the eighth embodiment;
FIG. 24 is a structure diagram of a ninth embodiment according to the present disclosure;
FIG. 25 is a diagram of the micro-valve of FIG. 24 at the end of operation (at third state);
FIGS. 27a-27c are section views of three structures in the ninth embodiment;
FIGS. 28-31 are structure diagrams of a tenth embodiment according to the present disclosure;
and
FIGS. 32-34 are the structure view and section view of three structures in an Eleventh embodiment according to the present disclosure.

DETAILED DESCRIPTION

The present disclosure will be more apparent in combination with drawings and embodiments.

First Embodiment

Figure 1:
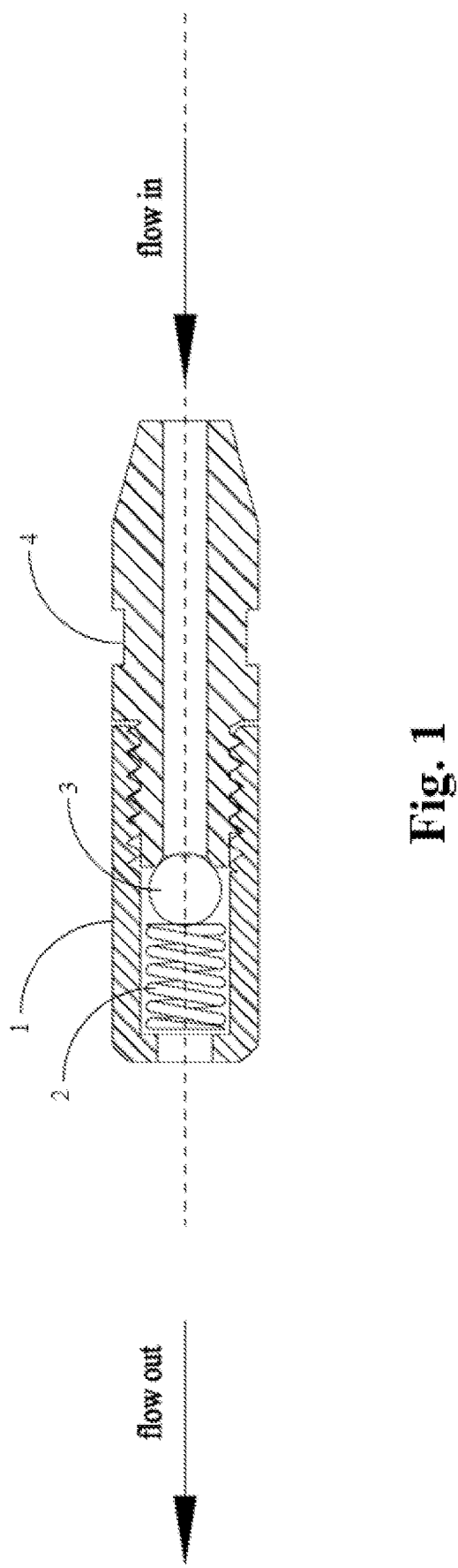
FIG. 1 is a first embodiment according to the present disclosure.
Figure 2:
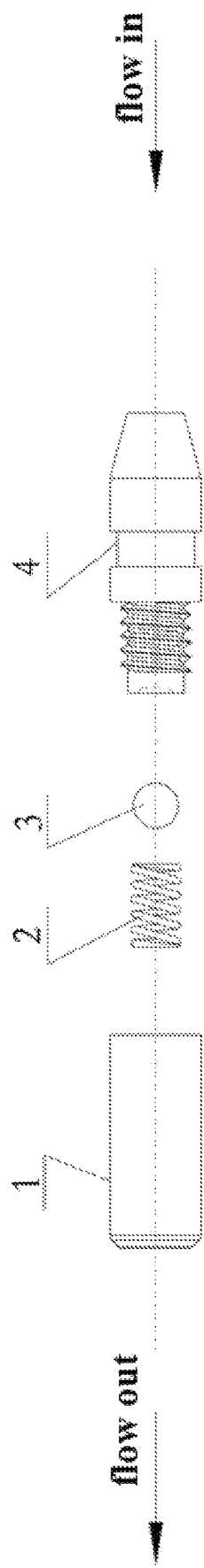
FIG. 2 is an exploded view of FIG. 1.
Figure 3:
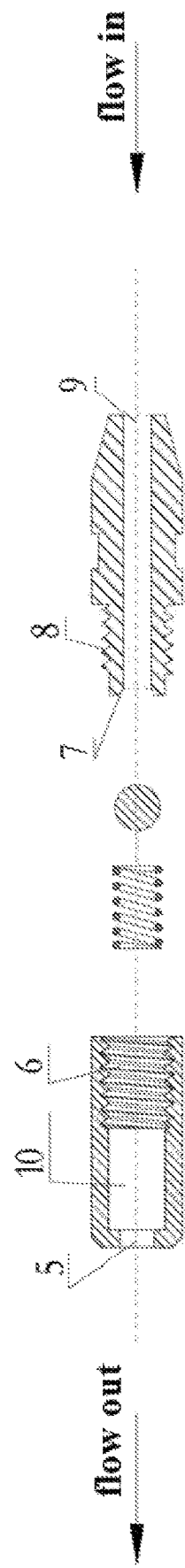
FIG. 3 is a partial section view of FIG. 1.

As illustrated in FIGS. 1-3, a split micro-valve is provided, which includes a first valve body section, i.e. a front valve body section 1, a second valve body section, i.e. a rear valve body section 4, a valve plug 3, and a spring 2. As shown in FIG. 3, the front valve body section 1 has a valve chamber 10. At a first end of the front valve body section 1 there is a liquid outlet 5, and at a second end of the front valve body section 1 there is an interior thread 6. At a first end of the rear valve body section 4 there is a liquid inlet 9, at a second end of the rear body section 4 there is an exterior thread 8. The interior thread 6 of the front valve body section 1 is matably connected to the exterior thread 8 of the rear valve body section to form a threaded connection. In addition, the rear valve body section 4 defines a valve seat 7 at its second end.

As illustrated in FIG. 1, the spring 2 and the valve plug 3 are disposed inside the valve chamber 10. A first end of the spring 2 is in contact with the valve plug 3, and a second end of the spring 2 is in contact with a sidewall of the liquid outlet of the valve chamber 10. In some embodiments, the valve plug is a spherical valve ball, which can be seated within the valve seat of the rear valve body section.

In some embodiments, the one-way valve can be used inside of an analgesic pump, an insulin pump, a needleless syringe, or an atomizer. It's advantageous to reduce the volume of structure, and thus to develop a portable wearable administrating device.

When manufacturing a precise syringe, flow requirements are illustrated below in Table 2.

TABLE 2

Flow rate requirements for a precise syringe

| Total amount of injection (μl) | Inner diameter of syringe (mm) | Minimum flow rate (ml/min) | Maximum flow rate (ml/min) |
|---|---|---|---|
| 10 | 0.485 | 0.184 | 0.027 |
| 25 | 0.729 | 0.417 | 0.626 |
| 50 | 1.03 | 0.833 | 0.125 |
| 100 | 1.457 | 1.667 | 0.250 |
| 250 | 2.304 | 4.169 | 0.625 |
| 500 | 3.256 | 8.326 | 1.248 |

In the embodiment, a capillary stainless steel tube is used as a valve sleeve of the body for a micro-valve, which can fully satisfy the requirement on the size of inner diameter of the micro-valve in a precise syringe application. That is, corresponding valves that match with the required inner diameter sizes can be mounted with the same syringe needle based on the requirements on different flow rates.

Second Embodiment

Figure 4:
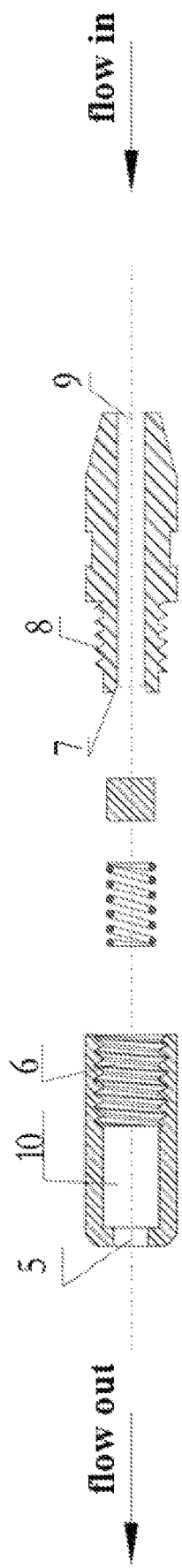
FIG. 4 is a structure diagram of a second embodiment.

As illustrated in FIG. 4, a split micro-valve is provided, which includes a front valve body section 1, a rear valve body section 4, a valve plug 3, and a spring 2. The front valve body section 1 has a valve chamber 10. At a first end of the front valve body section 1 there is a liquid outlet 5, and at a second end of the front valve body section 1 there is an interior thread 6. At a first end of the rear valve body section 4 there is a liquid inlet 9, and at a second end of the rear body section 4 there is an exterior thread. The interior thread 6 of the front valve body section 1 is matably connected to the exterior thread 8 of the rear valve body section to form a threaded connection. In addition, the rear valve body section 4 defines a valve seat 7 at its second end. The spring 2 and the valve plug 3 are disposed inside the valve chamber 10. In the embodiment, the valve plug is cylindrical.

Third Embodiment

Figure 5:
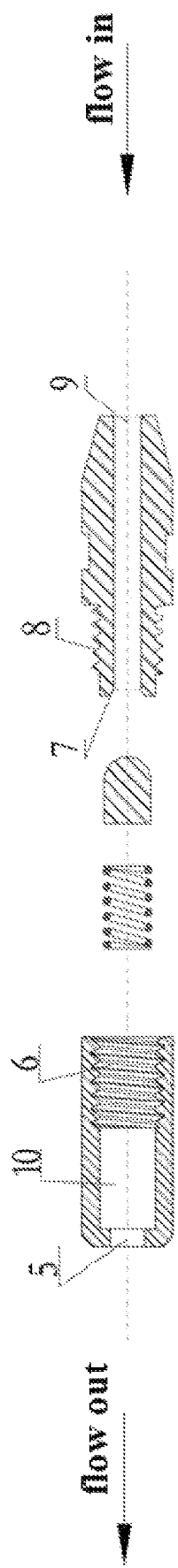
FIG. 5 is a structure diagram of a third embodiment.

As illustrated in FIG. 5, a split micro-valve is provided, which includes a front valve body 1, a rear valve body 4, a valve plug 3, and a spring 2. The front valve body section 1 has a valve chamber 10. At a first end of the front valve body section 1 there is a liquid outlet 5, and at a second end of the front valve body section 1 there is an interior thread 6. At a first end of the rear valve body section 4 there is a liquid inlet 9, and at a second end of the rear body section 4 there is an exterior thread. The interior thread 6 of the front valve body section 1 is matably connected to the exterior thread 8 of the rear valve body section to form a threaded connection. In addition, the rear valve body section 4 defines a valve seat 7 at its second end. The spring 2 and the valve plug 3 are disposed inside the valve chamber 10. In the embodiment, a first end of the valve plug that contacts with the valve seat is hemispherical, and a second end of the valve plug is cylindrical.

Fourth Embodiment

Figure 6:
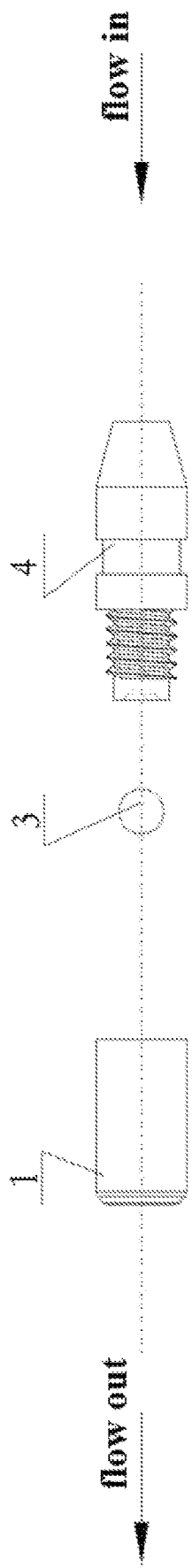
FIG. 6 is a diagram of a fourth embodiment.
Figure 7:
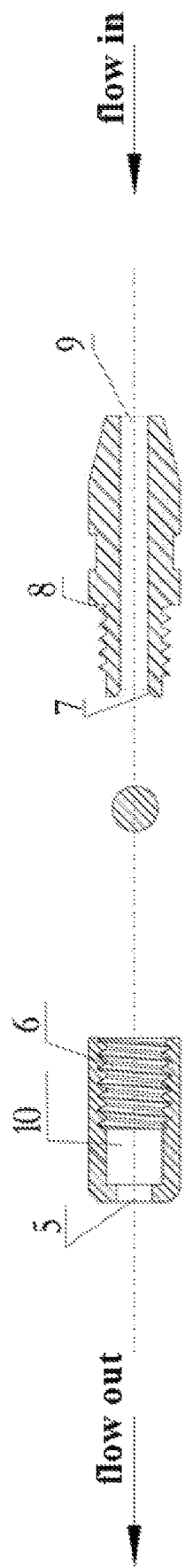
FIG. 7 is a section view of FIG. 6.

As illustrated in FIGS. 6 and 7, a split micro-valve is provided, which includes a front valve body 1, a rear valve body 4, and a valve plug 3. The front valve body section 1 has a valve chamber 10. At a first end of the front valve body section 1 there is a liquid outlet 5, and at a second end of the front valve body section 1 there is an interior thread 6. At a first end of the rear valve body section 4 there is a liquid inlet 9, and at a second end of the rear body section 4 there is an exterior thread. The interior thread 6 of the front valve body section 1 is matably connected to the exterior thread 8 of the rear valve body section to form a threaded connection. In addition, the rear valve body section 4 defines a valve seat 7 at its second end.

In the embodiment, the valve plug is spherical, and no spring is disposed. Since the volume of the valve chamber is small, the spherical valve plug is sealingly seated on the valve seat under the pressure from the outlet side when the micro-valve is in use.

Fifth Embodiment

Application of a Micro-Valve of the Present Application

The interventional injection of chemotherapeutic drugs in the treatment of cancer requires multiple points of dispersive microinjection. For an asthma patient in an acute attack, an aerosol inhalation of high concentration drug is required at a time to relieve the patient's acute symptom. The dosage of aerosol is generally 15-30 μl each time. When using a compound drug having various substances mixed in proportion, it's desired to have a precise output control over the minimum flow. In order to reach a minimum controllable output amount (volume), two key problems are needed to be solved: (1) decreasing the area of a working section; and (2) achieving a small displacement.

The micro-valve of the present application can be applied in flow control during inhalation of drug liquid from an atomizer. A minimum inner diameter of the valve chamber 10 can be as small as 0.4 mm, which reduces an area of a working section significantly. Moreover, under a same liquid pressure, the displacement of a valve plug can be adjusted by changing the length of the valve plug, compression amount of a spring, or stiffness of a spring, thereby satisfying the design requirement on precision.

Figure 8:
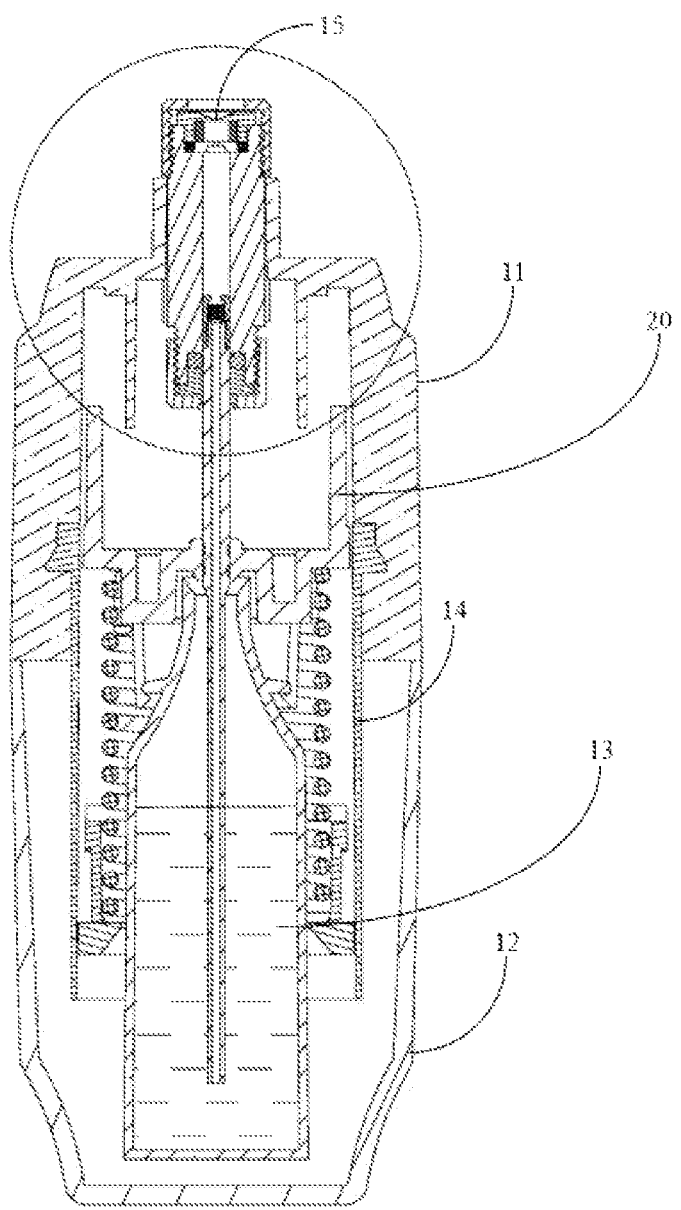
FIG. 8 is a structure diagram illustrating an application scenario as a fifth embodiment.
Figure 9:
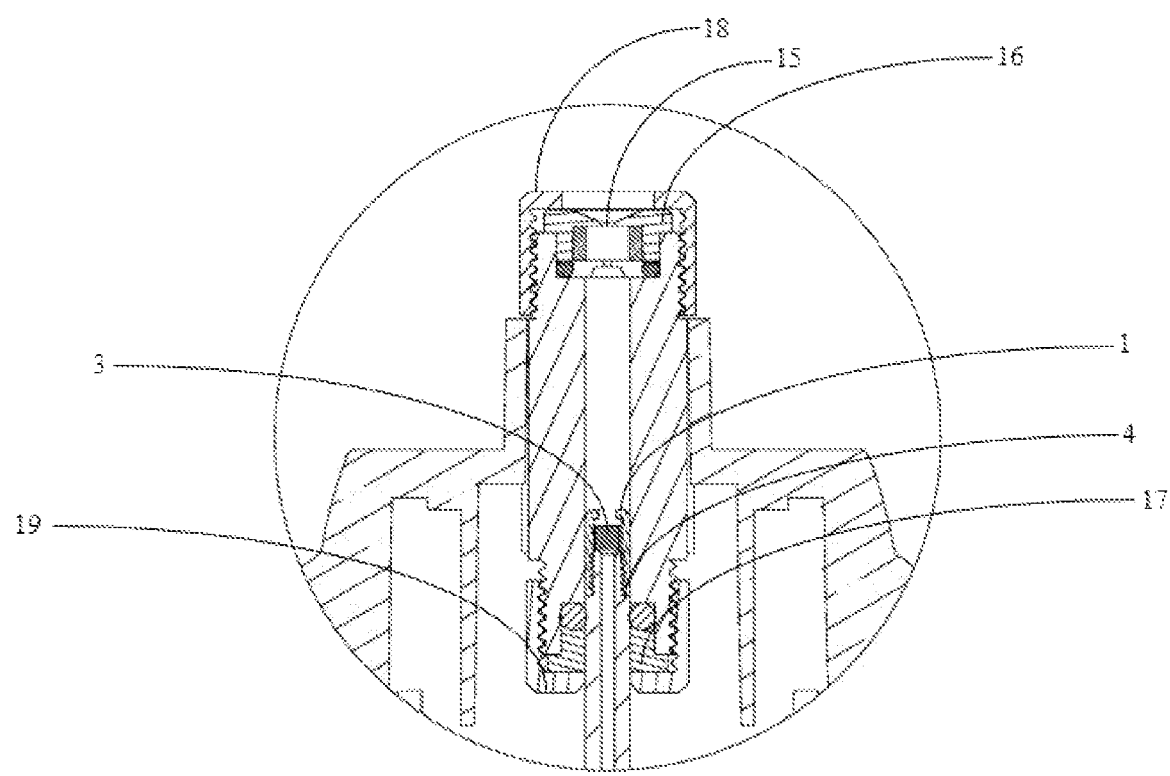
FIG. 9 is a partial enlarged view of FIG. 8.
Figure 10:
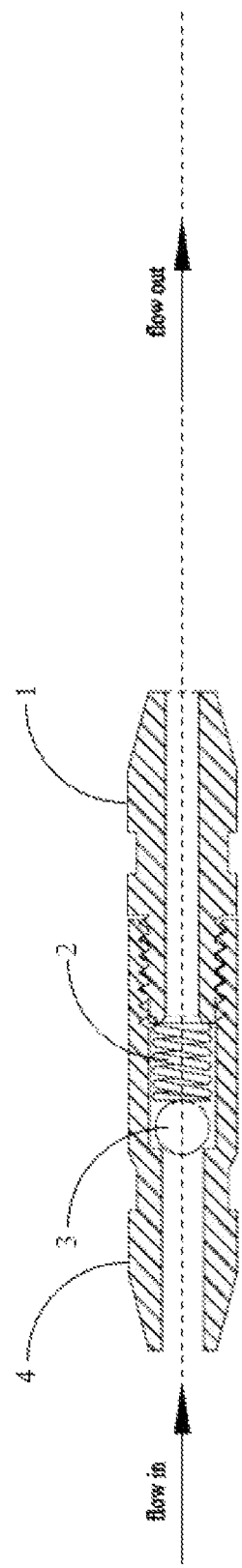
FIG. 10 is a structure diagram of a sixth embodiment.
Figure 11:
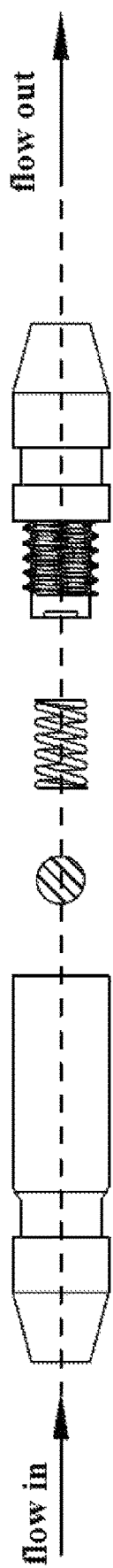
FIG. 11 is an exploded view of FIG. 10.
Figure 12:
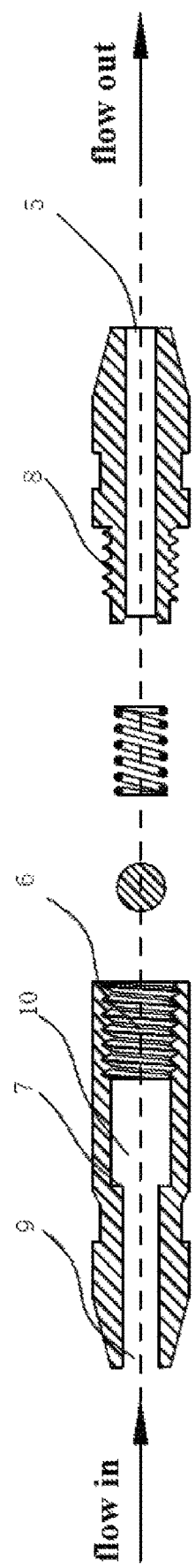
FIG. 12 is a section view of FIG. 11.
Figure 13:
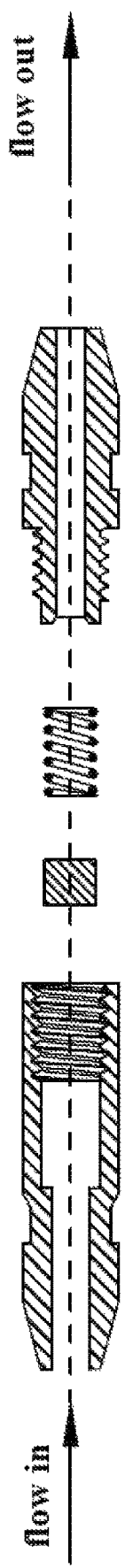
FIGS. 13 and 14 are section views of other two structures in the sixth embodiment.
Figure 14:
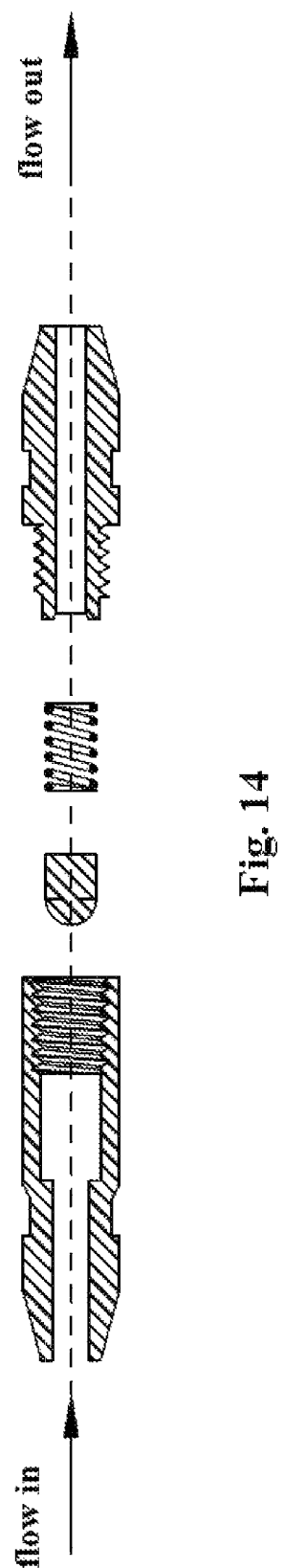

As illustrated in FIGS. 8 and 9, an atomizer has an upper housing 11 and a lower housing 12. A liquid pool 13, a spring and a spring-positioning shell 14 are disposed inside the lower housing 12. In the embodiment, a rear valve body section 4 is integrally formed with an inlet tube, which extends into the liquid pool 13. A front valve body section 1 is threadedly coupled with the rear valve body section 4. The front valve body section 1 and rear valve body section 4 form a valve body, which is inserted into a flow channel. A distal end of the flow channel adjacent to an atomizing outlet 15 is disposed with a positioning hole, which prevents the valve body from escaping out of the flow channel. Furthermore, the atomizer further include a first sealing 16, a second sealing 17, a first fastener 18, and a second fastener 19 to sustain the stability of the valve body in a movement direction. A micro-channel is disposed between the positioning hole and the atomizing outlet, such that a high liquid pressure can be generated from an instant decrease of diameter of the channel when the liquid flows from the positioning hole having a diameter of 0.4 mm to the atomizing outlet having a diameter of 0.005 mm. The high liquid pressure pushes the valve plug 3 back against a liquid inlet of the rear valve body section 4, thereby preventing the liquid from flowing back and forcing the liquid flow toward the atomizing outlet. The valve body is connected to the liquid pool 13 via a connecting member 20, so as to achieve a synchronous movement.

First state: initially, the micro-valve is connected to the liquid pool 13 via the connecting member 20, and the micro-valve is below the atomizing outlet 15. A peripheral spring is pre-compressed, with its upper portion pressed against the connecting member 20 and its lower portion fixed by the spring-positioning shell 14.

Second state: at the beginning of the liquid dispensing operation, the connecting member 20 is forced to move down to compress the peripheral spring further, and the micro-valve and liquid pool move down along with the connecting member. The movement of the micro-valve away from the atomizing outlet causes the valve plug to float upward, such that liquid is infused into the flow channel.

Third state: at the end of the liquid dispensing operation, the force exerted on the connecting member is released, such that the compression force on the peripheral spring rapidly decreases to move itself back to a position at the first state. The connecting member rapidly moves upward with the liquid pool and the micro-valve. The liquid in the flow channel is pushed by the micro-valve, and the valve plug is pressed by the liquid against the valve seat 7 of the rear valve body section 4, thereby preventing liquid from flowing back. Consequently, liquid in the flow channel is dispensed out from the atomizing outlet.

| Size of valve chamber (mm) | Size of valve plug (mm) | Size of tube chamber (mm) | Size of outlet (mm) | Dosage atomized each time (g) |
|---|---|---|---|---|
| Φ 1.6 * 2.0 | Φ 1.5 * 1.5 | Φ 1.8 * 10 | 0.005 | 0.45 g |
| Φ 1.4 * 1.8 | Φ 1.3 * 1.3 | Φ 1.6 * 10 | 0.005 | 0.30 g |

Sixth Embodiment

As illustrated in FIGS. 10-12, a split micro-valve includes a valve body and a valve plug 3. The valve body includes a first valve body section, i.e. a front valve body section 1, and a second valve body section, i.e. a rear valve body section 4. At a first end of the front valve body section 1 there is a liquid outlet 5, and at a second end of the front valve body section 1 there is an exterior thread 8. The rear valve body 4 has a valve chamber 10. At a first end of the rear valve body section 4 there is a liquid inlet 9, and at a second end of the rear valve body section 4 there is an interior thread 6. The exterior thread 8 of the front valve body section 1 is threadedly coupled to the interior thread 6 of the rear valve body section 4. In addition, a joint between the valve chamber of the rear valve body section and the liquid inlet 9 form a valve seat 7. The valve plug 3 is disposed inside the valve chamber 10 of the rear valve body section, and is matable with the valve seat 7 at the rear valve body section.

A spring 2 is disposed inside the valve chamber 10. A first end of the spring 2 is in contact with the valve plug 3, and a second end of the spring 2 is in contact with the end of the rear valve body 1 having the exterior thread.

In some embodiments, as illustrated in FIGS. 12, 13, and 14 respectively, the valve plug can be spherical or cylindrical. Alternatively, a first end of the valve plug that contacts with the valve seat can be hemispherical and a second end of the valve plug can be cylindrical.

Seventh Embodiment

FIGS. 15 and 16 respectively show a structure diagram and an exploded view of a split micro-valve 100 according to another embodiment of the present application, wherein the function and structure of the components that are the same or similar as in the embodiment illustrated in FIGS. 1-7 can refer to the description above. As shown in FIGS. 15 and 16, the split micro-valve 100 includes a front valve body 101 and a rear valve body 104. The front valve body 101 has a liquid outlet 105 and an interior thread 106, and defines a valve chamber 110; the rear valve body 104 has an exterior thread 108 and a liquid inlet 109. Wherein the exterior thread 108 extends to an end of the rear valve body 104 and the end of the rear valve body 104 defines a valve seat 107. It can be understood that in some embodiments, the exterior threads 108 may also not extend to the end of the rear valve body 104. The front valve body 101 and the rear valve body 104 are threadedly coupled together through the interior thread 106 and the exterior thread 108. As shown in FIG. 15, when the front valve body 101 is threadedly coupled to the rear valve body 104, a valve plug 103 and a spring 102 are received in the valve chamber 110. In particular, the spring 102 shown in FIG. 15 is disposed closer to the liquid inlet 109 than the valve plug 103. As shown, the valve plug 103 is disposed having a spherical shape.

FIGS. 17*a*-17*c* show a perspective view, a front view and a top view of the spring 102 of FIG. 15. As shown in FIGS. 17*a*-17*c*, the spring 102 is a reduced diameter spiral spring which, in a relaxed state, has a generally tapered or truncated taper shape, such as a conical or truncated cone shape. In other embodiments, the spring 102 can also have a cylindrical shape, that is, a spiral spring with equal diameter. In certain embodiment, the spring 102 has a first end 121 and a second end 122 opposed to each other, and wherein the spring has a maximum diameter at the first end 121 and a minimum diameter at the second end 122. That is, the diameter of the spring wire gradually decreases from the first end 121 to the second end 122. In some embodiments, when the first end 121 and the second end 122 of the spring 102 are compressed, the spring wires at different positions of the spring 102 nest with each other and the spring 102 as a whole is substantially in the same plane, thereby forming a coiled-up sealing surface (see FIG. 17*c*). In other embodiments, when the first end 121 and the second end 122 of the spring 102 are compressed, the spring wires at different positions between the first end 121 and the second end 122 may also contact each other but are not nested, such that the spring is compressed to have a truncated cone shape. It should be noted that although the spring 102 shown in FIGS. 17*a*-17*c* has the conical or a truncated cone shape, in practical applications, the shape of the spring can be designed and adjusted according to practical applications.

In some embodiments, the outer surface of the spring 102 has a sealing material such as silicone, rubber, or other sealing material with suitable resilience. When the spring 102 is compressed, the sealing material can effectively seal the gap that may exist between the two mutually contacting spring wires, so that the compressed spring 102 has a good sealing effect.

In some embodiments, the second end 122 of the spring 102 can be fixed to the rear valve body, such as welded or bonded to the rear valve body. In other embodiments, the spring 102 may not be fixed to the rear valve body.

Figure 15:
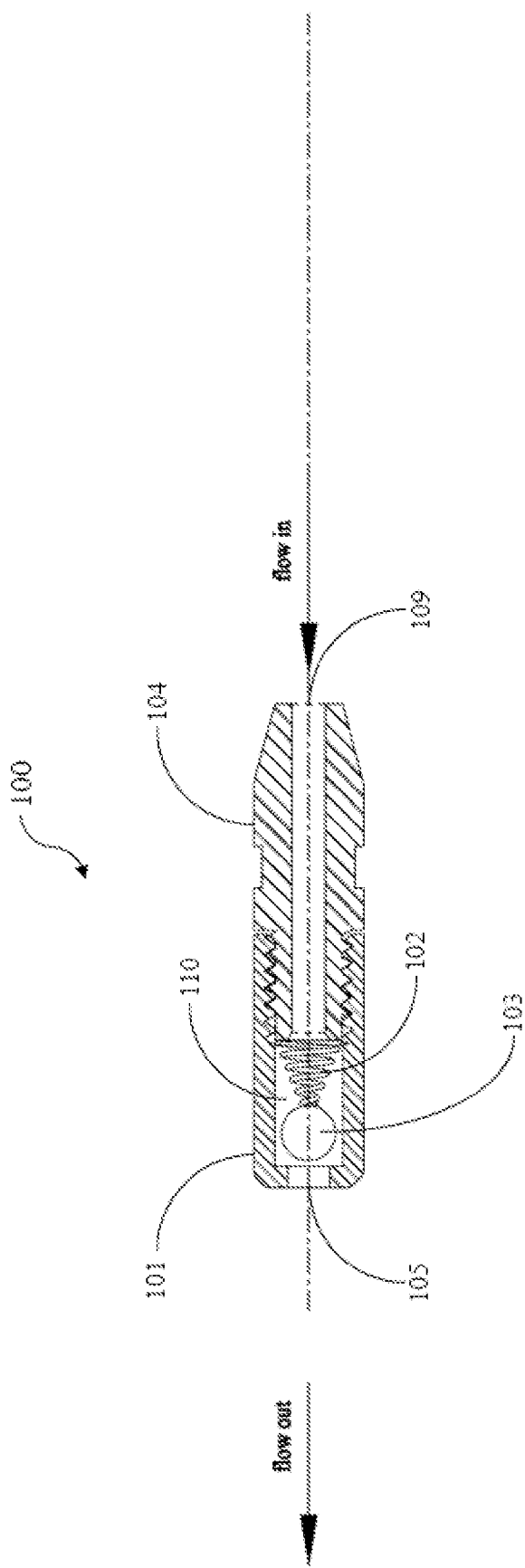
FIG. 15 is a structure diagram of a seventh embodiment according to the present disclosure.
Figure 16:
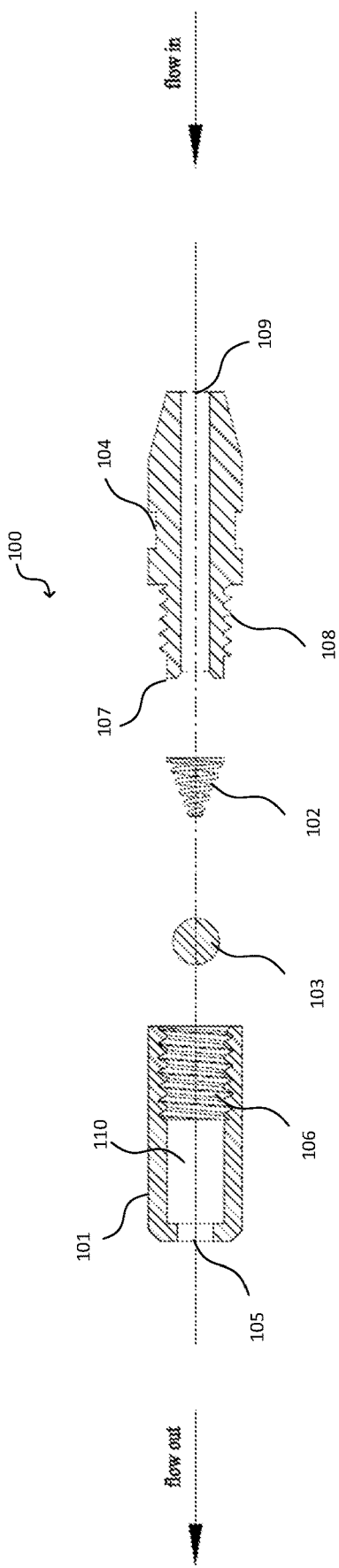
FIG. 16 is an exploded view of FIG. 15.
Figure 17B:
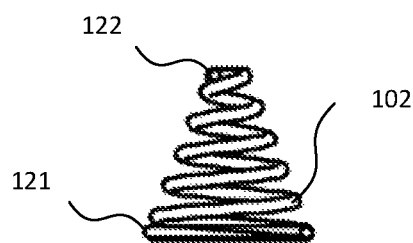
FIGS. 17a-17c are a structure view, front view, and top view of the spring in FIG. 15.
Figure 17C:
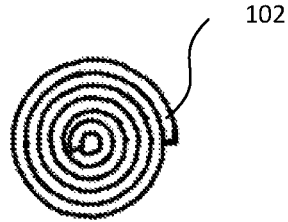
Figure 17A:
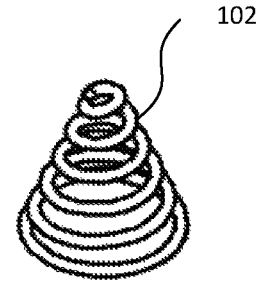

Return to FIGS. 15 and 16, the spring 102 is in the liquid-inflow position, when the atomizer pumps the liquid from the liquid pool into the tube at the Second State (the start of operation). At this time, the liquid flows into the micro-valve 100 from the liquid pool through the liquid inlet 109 in the direction indicated by the arrow in FIGS. 15 and 16, and flows out of the liquid outlet 105 into the tube of the atomizer. At this time, the valve plug 103 does not compress the spring 102 toward the liquid inlet 109, so the valve seat 107 is open.

Figure 18:
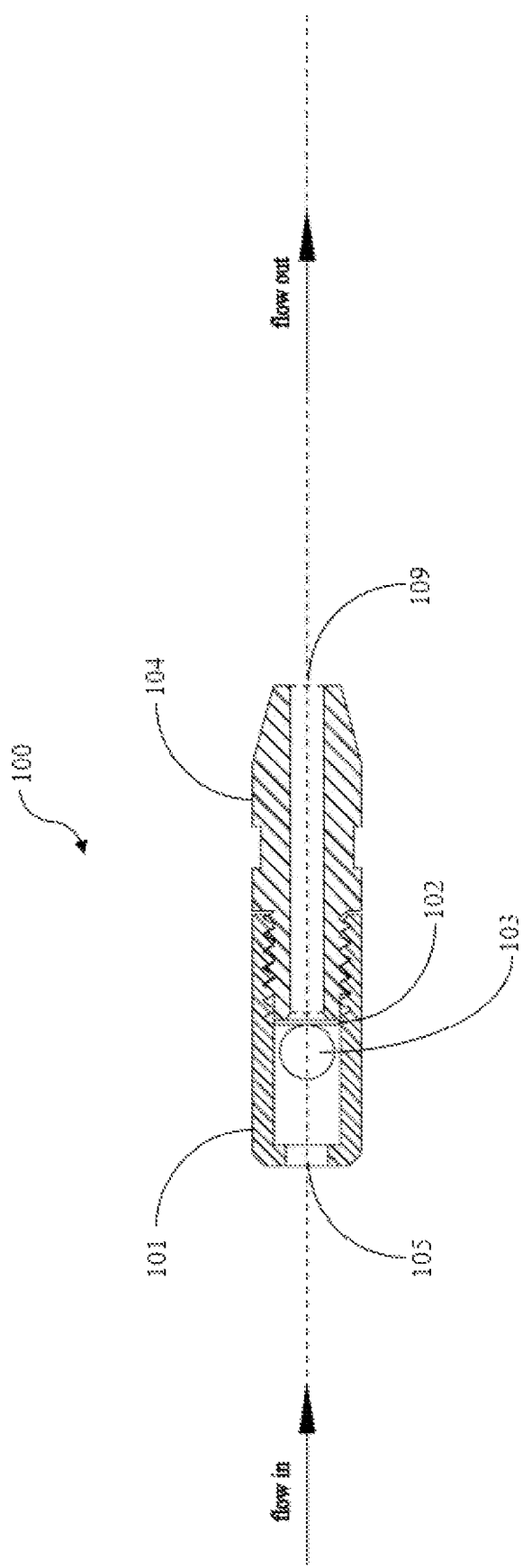
FIG. 18 is a diagram of the micro-valve of FIG. 15 at the end of operation (at third state)
Figure 26B:
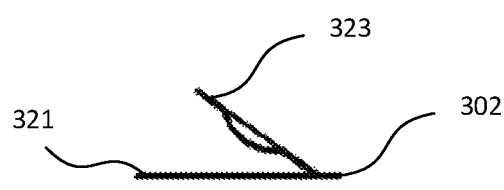
FIGS. 26a-26c is the structure view, front view, and top view of the leaf spring in the ninth embodiment.
Figure 26A:
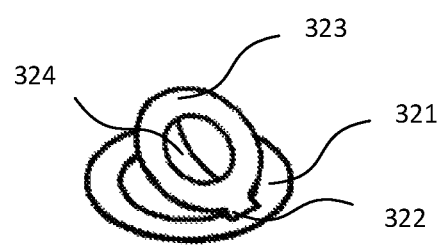
Figure 26C:
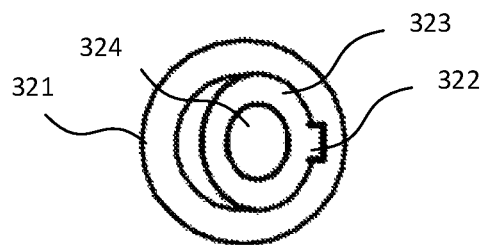

FIG. 18 shows the structure of the micro-valve 100 when the atomizer is in the Third State (the end of operation). As shown in FIG. 18, when the liquid in the tube is pushed by the micro-valve 100 and dispensed from the atomizer, the increased pressure in the tube downstream of the liquid outlet 105 causes the valve plug 103 to move toward the liquid inlet 109, thereby compressing the spring 102 together with the valve seat 107. At this time, the spring is in the liquid-outflow position. As mentioned above, the spring 102 can be compressed into a coiled-up sealing surface that can seal the valve seat 107 alone or in conjunction with the valve plug, so as to prevent backflow of liquid via the valve seat 107.

The embodiment of the atomizer shown in FIGS. 15 to 16 includes a spring 102 adjacent the liquid inlet 109 without including a spring adjacent the liquid outlet 105. In other embodiments, the atomizer can include springs adjacent both the inlet and outlet, i.e., the spring of the embodiment of FIG. 1 can be further included in the embodiment illustrated in FIGS. 15 and 16. The length and elasticity of the two springs can be designed so that the spring close to the liquid outlet prevents the valve plug from blocking the liquid outlet when pumping liquid (the Second State), and the spring close the liquid inlet is compressed to seal the valve seat 107 when dispensing liquid (the Third State).

FIGS. 19*a* and 19*b* illustrate another embodiment of a split micro-valve 100 respectively. In the embodiment of FIG. 19*a*, the valve plug 103 is configured to have a substantially cylindrical shape; and in the embodiment of FIG. 19*b*, the valve plug 103 is configured to have a semi-cylindrical and hemispherical shape. A person skilled in the art will appreciate that the valve plug 103 can be designed to have different shapes as needed.

Eighth Embodiment

FIGS. 20 and 21 illustrate perspective views of a split type micro-valve 200 according to another embodiment of the present application. FIGS. 22*a*-22*c* illustrate a structure of the spring of the split micro-valve 200. As shown in FIGS. 22*a*-22*c*, the spring 202 of the split micro-valve 200 is similar to the spring 102, but is further disposed with a blocking member 223 at its second end 222. In an embodiment, the blocking member 223 can have a spherical shape; a person skilled in the art will appreciated that the blocking member 223 can be designed to have other shapes as needed. When the spring 202 is compressed in the direction toward the liquid inlet 209 via the valve body 203 together with the valve seat 207, the blocking member 223 can abut against the valve body 203. Further, when the spring 202 is fully compressed, the blocking member 223 substantially blocks a through hole at the center of the fully compressed spring 202. It will be appreciated that the split micro-valve 200 can further prevent backflow of liquid to the liquid pool as compared to the split micro-valve 100.

FIGS. 23*a*-23*c* illustrate three embodiments of the split micro-valve 200. It will be appreciated that the valve plug 203 can be designed to be spherical (FIG. 23*a*), cylindrical (FIG. 23*b*), and a semi-cylindrical and hemispherical shape as needed (FIG. 23*c*). A person skilled in the art will appreciate that the valve plug 203 can be designed to have different shapes as needed.

Ninth Embodiment

FIGS. 24 and 25 illustrate perspective views of a split micro-valve 300 according to another embodiment of the present application, wherein like components are indicated by like reference numbers in FIGS. 15-19 plus 200. FIGS. 26*a*-26*c* illustrate a structure of the spring of the split micro-valve 300. As shown in FIGS. 26*a*-26*c*, the split micro-valve 300 includes a leaf spring 302. The leaf spring 302 includes an annular portion 321 and a circular portion 323 that is connected to the annular portion 321 by a hinge 322. It will be appreciated that the circular portion 323 can be switched between an open position and a closed position by the hinge 322. When in the closed position, the annular portion 321 and the circular portion 323 form a complete sealing surface. In an embodiment, the circular portion 323 further includes a recess 324 that faces the liquid inlet 309, and the recess 324 is capable of engaging the valve plug 303.

Return to FIG. 24, when the atomizer pumps the liquid in the liquid pool into the tube at the aforementioned Second State (the start of operation), the liquid flows from the liquid pool into the micro-valve 300 through the liquid inlet 309 in the direction indicated by the arrow in FIG. 24, and flows out of the liquid outlet 305 into the tube. The circular portion 323 is now in the open position to allow the liquid to flow through.

As shown in FIG. 25, when the liquid in the tube is pushed by the micro-valve 300 to dispense out of the atomizer, the increased pressure in the tube causes the valve plug 303 to move toward the liquid inlet 309, thereby pressing, together with the valve seat 307, the circular portion 323 to the closed position. At this time, the circular portion 323 which is pressed to the closed position forms a complete sealing surface along with the annular portion 321, so that the backflow of the liquid back into the liquid pool can be well prevented.

FIGS. 27*a*-27*c* illustrate three embodiments of the split micro-valve 300. It will be appreciated that the valve plug 303 can be designed to have shapes like spherical (FIG. 27*a*), cylindrical (FIG. 27*b*), and cylindrical at one end and hemispherical at the other end (FIG. 27*c*). A person skilled in the art will appreciate that the valve plug 303 can be designed to have different shapes as needed.

Tenth Embodiment

FIGS. 28 and 29 illustrate perspective views of a split micro-valve 400 in accordance with another embodiment of the present application, wherein like components are indicated by like reference numbers in FIGS. 15-19 plus 300. As compared to the split micro-valve 300, the split micro-valve 400 further includes a limiting member 422 located within the valve chamber 410. When the front valve body 401 is coupled with the rear valve body 404, the limiting member 422 can abut the leaf spring 402 against the valve seat 407, thereby preventing the leaf spring 402 from getting off the valve seat 407 in the Second State (the start of operation) of the atomizer. In the embodiment of FIGS. 28-29, the limiting member 422 is a limiting spring having a length substantially equal to or longer than the length of the valve chamber 410 such that when the front valve body 401 is coupled with the rear valve body 404, the limiting spring can abut the leaf spring 402 against the valve seat 407. It will be appreciated that since the limiting spring has a generally hollow cylindrical shape, the movement of the valve plug 403 in the valve chamber 410 is substantially unaffected by the limiting member 422.

FIGS. 30 and 31 illustrate perspective views of another embodiment of the split micro-valve 400. As illustrated in FIGS. 30 and 31, different from the limiting spring in the embodiment of FIGS. 28 and 29, the limiting member 422 of the split micro-valve 400 can also be a limiting sleeve, whose length is substantially equal to the length of the valve chamber 410 such that the limiting sleeve can abut the leaf spring 402 against the valve seat 407 when the front valve body 401 is coupled with the rear valve body 404. A person skilled in the art will appreciate that other types of limiting member can be used to secure the leaf spring 402 to the valve seat 407. In addition, the leaf spring 402 can also be secured to the valve seat 407 by other means, such as by welding or bonding.

If the leaf spring 402 is not fixed to the valve seat 407, the leaf spring 402 may get off the valve seat 407 in the operational start state of the atomizer (the Second State). In this case, when the atomizer is dispensing (the Third State), it may take a long time for the leaf spring 402 to return from the position where it is disengaged from valve seat 407 to the position against the valve seat 407 (where a sealing surface is formed at the valve seat 407), resulting in a small amount of liquid backflow. Therefore, the embodiment enables the leaf spring 402 to always be in a position abutting against the valve seat 407, which enables the leaf spring 402 to form a good sealing surface quickly and in time when the atomizer is dispensing, thereby avoiding or reducing liquid backflow as much as possible.

Eleventh Embodiment

Figure 32:
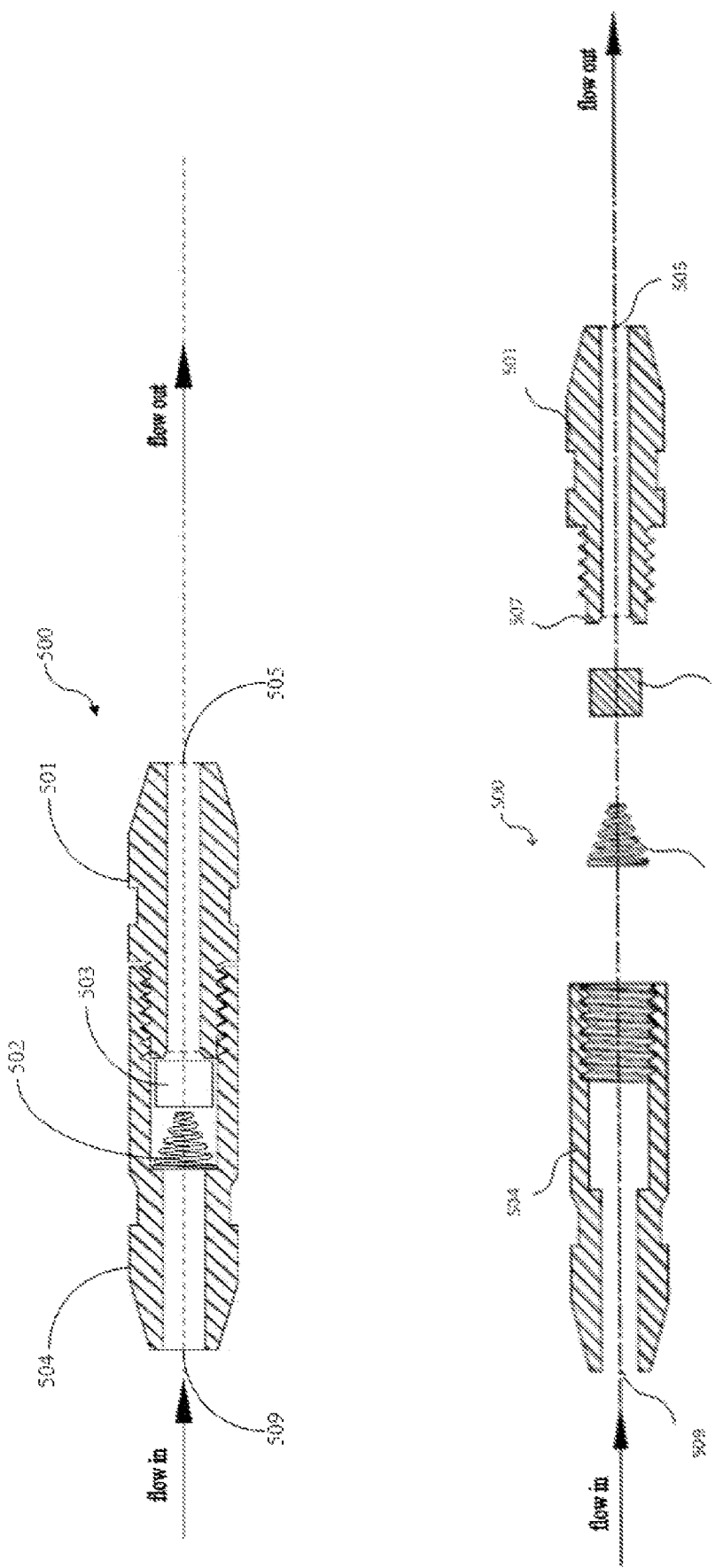
Figure 33:
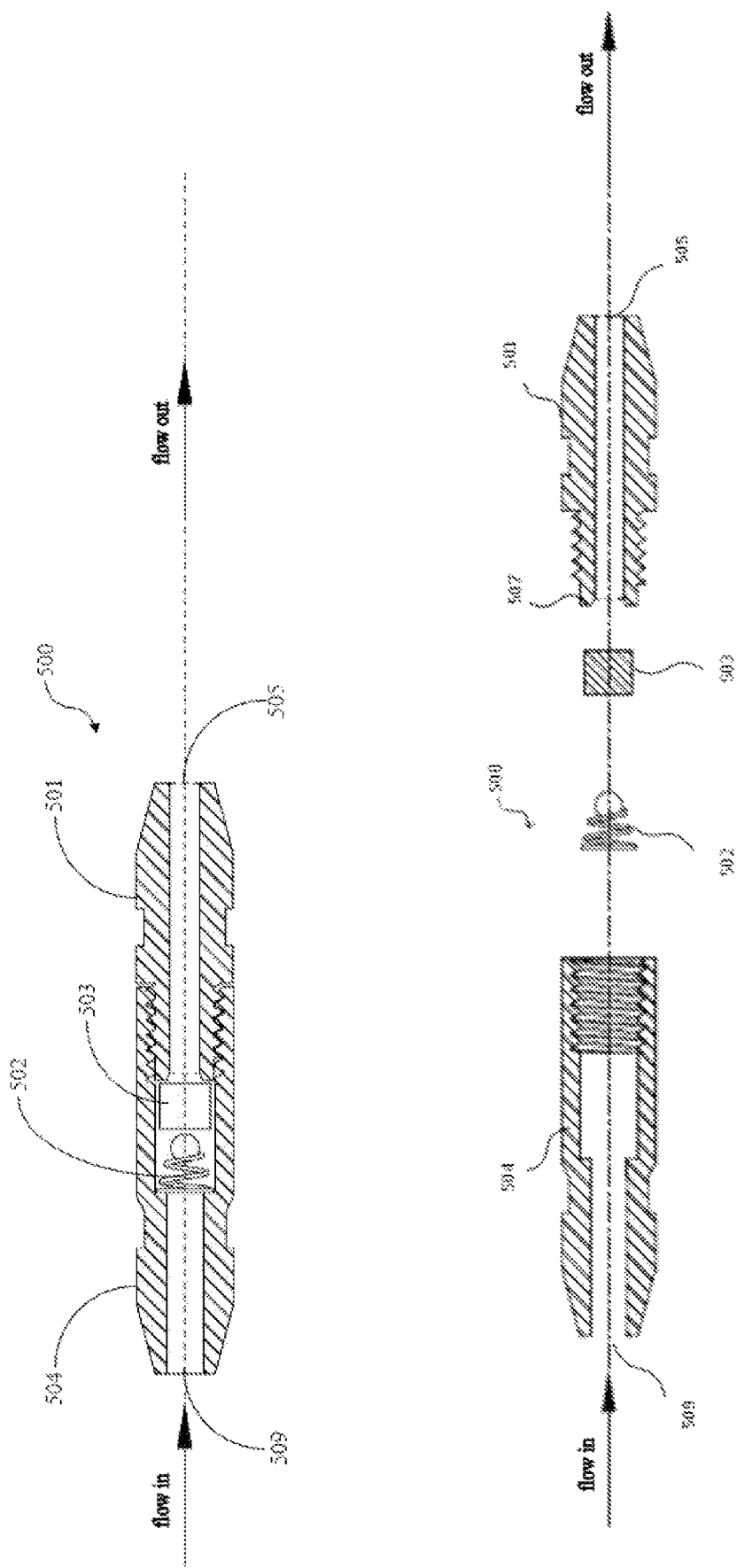

FIGS. 32-34 illustrate a split micro-valve 500 according to yet another embodiment of the present utility model. Unlike the split micro-valves 100, 200, 300, in the split micro-valve 500, the front valve body 501 has an exterior thread and a valve seat at the end of the exterior thread, and the rear valve body 504 has an interior thread and defines a valve chamber 410. The valve plug and spring (or leaf spring) of the split micro-valve 500 are similar to the valve plug and spring (or leaf spring) of the split micro-valves 100, 200, 300, and will not be described herein.

While the present disclosure has been illustrated and described in detail in the drawings and foregoing description, such illustration and description are to be considered illustrative or exemplary and not restrictive; the present disclosure is not limited to the disclosed embodiments. Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. Any reference signs in the claims should not be construed as limiting the scope. The scope and spirit of the present disclosure is defined by the appended claims.

What is claimed is:

1. A micro-valve comprising:
    a first valve body and a second valve body, at least one of the first and second valve bodies defining a valve chamber and a valve seat, the first valve body having a liquid outlet and the second valve body having a liquid inlet;
    a valve plug disposed within the valve chamber and movable within the valve chamber; and
    an elastic member disposed within the valve chamber and positioned closer to the liquid inlet than the valve plug;
    wherein the elastic member has a liquid-inflow position and a liquid-outflow position, and in the liquid-inflow position, the elastic member enables liquid to flow from the liquid inlet through the elastic member to the liquid outlet and wherein in the liquid-outflow position the elastic member together with the valve plug seals the valve seat; and wherein the elastic member includes a spiral spring having a conical or truncated cone shape; and wherein the spiral spring has a first end adjacent to the liquid inlet and a second end adjacent to the liquid outlet; and wherein the spiral spring has a maximum diameter at the first end and a minimum diameter at the second end; and wherein the elastic member further includes a blocking member disposed at the second end which engages the valve plug, and wherein the plug is a simple cylinder having no additional features; and wherein the blocking member is a sphere.

2. The micro-valve of claim 1, wherein the first valve body has an interior thread and the second valve body has an exterior thread, the first valve body and the second valve body threadedly coupled with each other.

3. The micro-valve of claim 1, wherein the second valve body has an interior thread and the first valve body has an exterior thread, the first valve body and the second valve body threadedly coupled with each other.

4. A microfluidic device comprising a micro-valve of claim 1.

5. A drug-delivery atomizer comprising:
    a lower housing having a liquid pool therein;
    an inlet tube extending into the liquid pool;
    and a micro-valve as in claim 1.

* * * * *